United States Patent [19]

Nakagaki et al.

[11] 3,808,357

[45] Apr. 30, 1974

[54] SINGLE TUBE COLOR CAMERA

[75] Inventors: Shintaro Nakagaki; Hideshi Tanaka; Takashi Shinozaki, all of Yokohama, Japan

[73] Assignee: Victor Company of Japan, Ltd., Yokohama-city, Kanagawa-ken, Japan

[22] Filed: Dec. 14, 1972

[21] Appl. No.: 315,157

[30] Foreign Application Priority Data

| | | |
|---|---|---|
| Dec. 18, 1971 | Japan | 46-103006 |
| Apr. 26, 1972 | Japan | 47-41832 |
| Apr. 30, 1972 | Japan | 47-43085 |
| May 29, 1972 | Japan | 47-53213 |

[52] U.S. Cl. .......... 178/5.4 ST
[51] Int. Cl. .......... H04n 9/06
[58] Field of Search .......... 178/5.4 ST

[56] References Cited

UNITED STATES PATENTS

| | | | |
|---|---|---|---|
| 3,715,466 | 2/1973 | Karato | 178/5.4 ST |
| 3,745,238 | 7/1973 | Yoneyama | 178/5.4 ST |

*Primary Examiner*—Robert L. Richardson
*Assistant Examiner*—George G. Stellar

[57] ABSTRACT

A color television signal generating apparatus comprises, essentially, a color-resolving striped filter, a camera tube provided with this filter, and color signal demodulation circuits for obtaining from the output signal of the camera tube required three primary color signals or three color difference signals. The color-resolving striped filter comprises a plurality of groups of filter stripes, each group comprising at least three filter stripes, respectively having specific widths and specific light transmission characteristics. These filter stripe widths and light transmission characteristics are so selected that the output signal of the camera tube is a superimposed signal comprising, in superimposition, a direct wave signal of the signal of one primary color light, a first modulated color signal representable as a signal resulting from the amplitude modulation of a carrier wave of a frequency equal to the space frequency of the filter stripes by the signal of a mixed color of the two primary colors other than the above mentioned one primary color, and a second modulated color signal representable as a signal resulting from the amplitude modulation of a carrier wave of a frequency equal to twice the space frequency by a primary color signal having a complementary color relationship to the above mentioned mixed signal.

8 Claims, 19 Drawing Figures

SINGLE TUBE COLOR CAMERA

BACKGROUND OF THE INVENTION

This invention relates generally to color television cameras and apparatuses therein for generating color television signals. More particularly, the invention relates to an apparatus for generating color television signals of excellent color reproducibility in color television cameras of the so-called "simple type."

In general, for a color television camera of the simple type, the prime requisites for which are small size and low price, a TV camera of two-tube organization depending on the so-called luminance-separation system wherein one camera pickup tube is used as a tube for generating luminance signals, while the other camera pickup tube is used as a tube for generating color signals is suitable. For this reason, many of the simple-type color TV cameras produced heretofore have been of this two-tube, luminance separation system type.

Ordinarily, this type of color TV camera has an organization wherein a suitable color resolving striped filter is inserted in the optical system of the camera tube for generating color signals thereof, and, further, the color signals are derived by a phase separation system or a frequency separation system. In a conventional color television camera, however, the above mentioned color-resolving striped filter has been unavoidably of a considerably complicated organization irrespective of which of the two systems is used for deriving the color signals.

Furthermore, in the case where the color signals are derived by a phase separation system, it is considered necessary to generate sampling pulses on the basis of information obtained from the index stripes in the color-resolving striped filter. This necessity has given rise to the disadvantagious requirement for the provision of a sampling pulse generating device of complicated circuit organization.

In the above mentioned color television camera, moreover, dot sequential, color information signals obtained by sampling are converted by "sampling hold" into simultaneous system color information signals. For this reason, noise of high frequency included within the dot sequential color information signals is extended on the time axis by the sampling hold means. Consequently, this high-frequency noise is converted into conspicuous noise of low frequency, and the signal-to-noise ratio of the camera signal becomes poor.

Another problem is that, in the case where color signals are derived by a frequency separation system, and a color-resolving striped filter is not provided in the optical system wherein expensive relay lenses and the like are used, it is difficult to form good optical images of the color resolving striped filter on the photoconductive layer of the camera tube. For this reason, color television cameras have tended to become larger in size and expensive.

Still another difficulty is that, when two or more camera tubes are used as camera tubes for generating color signals, color shading is caused by unevenness of shading mutually between the camera tubes, and images of good characteristics cannot be obtained because of ununiformity in variations in the characteristics of the camera tubes such as the variation of the temperature characteristics and variations with the elapse of time.

SUMMARY OF THE INVENTION

Accordingly, it is a general object of the present invention to provide a new and useful color television signal generating apparatus in a color television camera, in which apparatus the difficulties described above are overcome.

Another object of the invention is to provide a color television signal generating apparatus wherein the advantages respectively of the conventional phase separation system and frequency separation system are attained together through the use of a color-resolving striped filter of a special organization.

Still another object of the invention is to provide a novel color television signal generating apparatus wherein means such as means for generating sampling pulses and sampling hold means, which were necessary in known color television signal generating apparatuses of the phase separation system, are not required. Since these means are not required, color television signals of excellent signal-to-noise ratio can be obtained through the use of the apparatus of the present invention.

A further object of the invention is to provide a color television image pickup apparatus having a color-resolving striped filter capable of deriving at a raised level a direct-wave from the output signal of a camera tube.

A still further object of the invention is to provide a color television image pickup apparatus having a color-resolving striped filter which comprises narrow filter stripes of specific width and can be readily manufactured.

Further objects and additional features of the present invention will be apparent from the following detailed description with respect to a number of embodiments of practice illustrating preferred embodiments of the invention when read in conjunction with the accompanying drawings.

DETAILED DESCRIPTION

Figure 1:
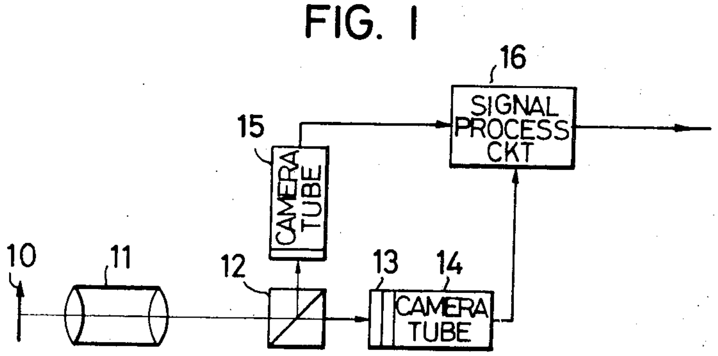
FIG. 1 is a schematic diagram indicating the essential organization of a color television camera of a luminance separation system of ordinary two-tube type.

Referring to FIG. 1, there is diagrammatically illustrated therein the essential organization of a color television camera depending on a separation luminance system of general two-tube type. Light rays of the image of an optical object 10 to be picked up pass through a camera lens 11, and one portion of these light rays is reflected by a half mirror 12 for optical path separation and forms an optical image of the image object 10 on the photoconductive surface of a camera pickup tube 15 for generating luminance signals. At the same time, the remainder portion of the light rays passing through the camera lens 11 is transmitted through the half mirror 12 and forms an optical image of the object 10 on a color-resolving striped filter 13.

This optical image formed on the filter 13 forms an optical image of the picked up object 10 which has been divided in accordance with the arrangement pattern of the filter stripes in the filter 13 on the photoconductive surface of a camera tube 14 for generating color signals through a lenticular lens (not shown) interposed, for example, between this filter 13 and the front-face glass of the camera tube 14. A luminance signal from the camera tube 15 and a color signal from the camera tube 14 are signal processed in a signal processing circuit 16 and sent out as a color television signal.

Figure 2:
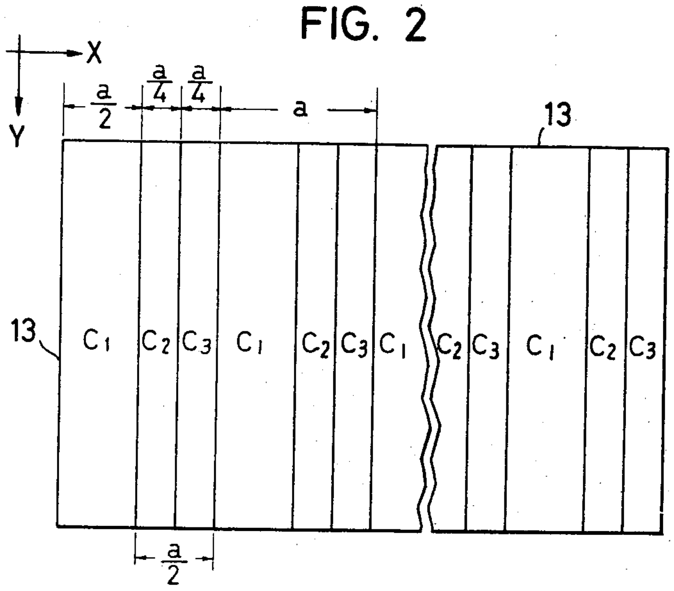
FIG. 2 is an enlarged fragmentary view showing one part of a first embodiment of a color-resolving striped filter suitable for use in the apparatus of the invention.

A specific embodiment of organization of a color-resolving striped filter 13 suitable for use in the color television signal generating apparatus of the invention is illustrated in FIG. 2. As indicated, the color-resolving striped filter 13 is composed of consecutively and contiguously laid, identical groups of stripes, each group comprising, in parallel and contiguous arrangement, a first filter stripe C1 of a width $a/2$, a second filter stripe of a width $a/4$, and a third filter stripe of a width $a/4$ in the sequence named. These stripes C1, C2, and C3 extend longitudinally in a direction $Y$ as indicated in FIG. 2 which is perpendicular to the horizontal scanning direction $X$ and are disposed with accurate regularity in the order described above. The space frequencies of these filters C1, C2, and C3 respectively have the same frequency value.

The light transmitting characteristics of these filter stripes C1, C2 and C3 are as follows. The first filter stripe C1 is adapted to transmit light of one primary color from among the three primary colors (red, green, and blue) of addition mixed colors. The second filter stripe C2 is adapted to transmit light of mixed colors of the primary color transmitted through the first filter stripe and one of the two primary colors other than that transmitted through the first filter stripe. The third filter stripe C3 is adapted to transmit the light of all colors.

More specifically, the second filter stripe C2 is adapted to have light transmission characteristics such that it is capable of transmitting light of colors respectively of the following relationships depending on whether the primary color light transmitted through the first filter stripe C1 is red, green, or blue.

| Primary color light transmitted through first filter stripe C1 | Color of light transmitted through second filter stripe C2 |
|---|---|
| red light | magenta (red blue) or yellow (red green) |
| green light | yellow (red green) or cyan (blue green) |
| blue light | magenta (red blue) or cyan (blue green) |

In one example of a color-resolving striped filter of the above described organization, the first filter stripe C1 is adapted to transmit blue light (B). The second filter stripe C2 is adapted to transmit the light of a mixture color, i.e., magenta (M) of blue light (B) and red light (R). Third filter stripe C3 is adapted to transmit the light of all colors, that is, white light (W), that is, a mixed color light of red light (R), green light (G), and blue light (B).

Figure 3:
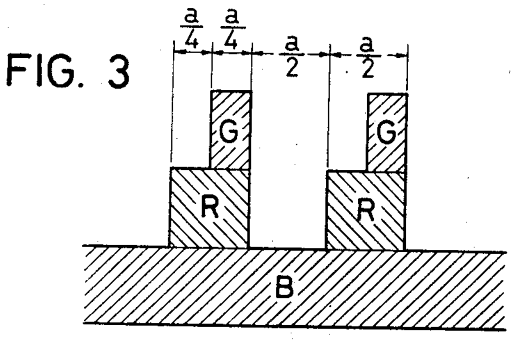
FIG. 3 is a diagram indicating the state of energy of transmitted light at the time when white light is projected onto the color-resolving striped filter shown in FIG. 2.

When white light (W) is projected onto this color-resolving striped filter 13 comprising filter stripes C1, C2, and C3 respectively possessing light transmitting characteristics as described above, the energy of the light thus transmitted assumes a state as indicated in FIG. 3. In this graphical representation, the horizontal direction, i.e., the X-axis direction represents energy distribution. That is, blue light (B) is distributed in a continuous manner in order to be transmitted through all filter stripes C1, C2, and C3, while red light (R) is distributed with a width of $a/2$ and, moreover, with a spacing of 2/2 so as to be transmitted through only the filter stripes C2 and C3. Green light (G) is distributed with a width $a/4$ and, moreover, with a spacing of $3a/4$ in order to be transmitted through only the filter stripe C3.

Figure 4:
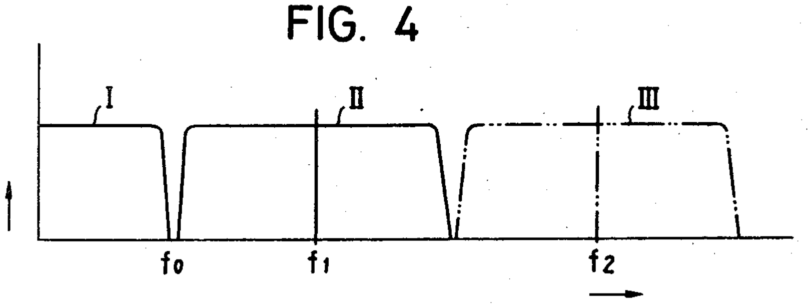
FIG. 4 is a graphical representation of frequency response indicating the frequency band of the output signal of a camera tube for generating color signals in the apparatus of the invention.

In the case where a filter composed of filter stripes C1, C2, and C3 as described above is used as the color-resolving striped filter 13 in the color television camera illustrated in FIG. 1, and white light (W) is projected thereonto from an object 10 to be picked up through the camera lens 11, output signals of frequency bands as indicated by curves I and II in FIG. 4 are obtained from the camera tube 14 for generating color signals.

That is, since blue light (B) is transmitted through all filter stripes C1, C2, and C3, its signal is contained in only the frequency band indicated by curve I in FIG. 4. The color-resolving striped filter 13 is so organized that the space frequency of all of the filter stripes C1, C2, and C3 are of the same value, herein denoted by $f1$. For this reason, red light (R) and green light (G) are contained with a frequency band as indicated by curve II in FIG. 4 as a signal produced by amplitude modulating a carrier wave of the same value $f1$ as the space frequency $f1$ determined by the arrangement of the above described filter stripes.

Hereinafter, a signal of the frequency band of curve I in FIG. 4 will be called a "direct signal," while a signal of the frequency band of curve II will be called a "first modulated color signal." The output of the camera tube 14 for color signal generation may be represented as being a signal of a form resulting from the superimposition of a first modulated color signal on a direct signal.

Figure 5:
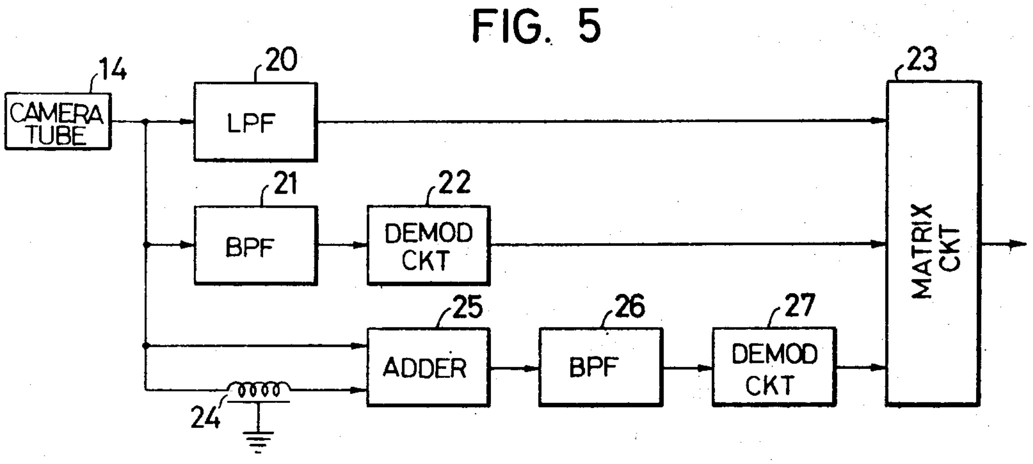
FIG. 5 is a block diagram indicating the essential organization of a first embodiment of a color signal demodulation circuit.

This superimposed output signal of the camera tube 14 is supplied respectively to a low-pass filter 20 and a band-pass filter 21 of a color signal demodulation circuit, one example of which is shown by block diagram in FIG. 5. Here, the above mentioned direct signal of curve I is derived from the low-pass filter 20, while the first modulated color signal of curve II is derived from the band-pass filter 21. The output modulated color signal of the band-pass filter 21 which has been thus filtered is supplied to a demodulation circuit 22.

Here, as described above, blue light (B) is transmitted through the entire surface of the color-resolving striped filter 13, and red light (R) is transmitted with a width $a/2$ and with a positional spacing $a$ of the filter stripes as the cyclic period, while green light (G) is transmitted with a width $a/4$ and with a positional spacing $2a$ of the filter stripes as the cyclic period. The period $a$ and the space frequency $f1$ have a relationship expressable by $f1 = 1/a$.

Accordingly, the output direct signal of the low-pass filter 20 is the sum signal of a signal ($SB$) due to the blue light (B), a signal ($SR/2$) of the average value of the red light (R), and a signal ($SG/4$) of the average value of the green light (G). Furthermore, as a result of detection in the demodulation circuit 22 of the first modulated color signal derived from the band-pass filter 21, the signal thus obtained is the sum signal of a signal ($SR/2$) of the average value of the red light (R) and a signal ($SG/4$) of the average value of the green light (G). In this connection, it is to be observed that the coefficients such as one-half and one-fourth of the above described signals are numbers in the case where the light transmission factors of all filter stripes are mutually equal. Accordingly, in the case where these transmission factors are mutually different, the value of these coefficients respectively become different. However, by appropriately selecting the mixture matrix ratio of the signals in a matrix circuit 23 described hereinafter, it is possible to compensate, as a resultant effect, the mutual differences in these coefficient values and thereby to obtain the desired signals.

The output signals of the above mentioned low-pass filter 20 and demodulation circuit 22 are respectively supplied to the matrix circuit 23.

On one hand, the output signal from the camera tube 14 is supplied to an adder 25 either directly or by way of a delay circuit (delay line) 24. The delay line 24 has a delay characteristic such that it delays a signal by a time corresponding to one half of the period ($a/2$) of the space frequency $f1$ of the filter stripes, that is, a time corresponding to one period ($a/2$) of a wave of a frequency which is twice that of the carrier wave $f1$.

Figure 6A:
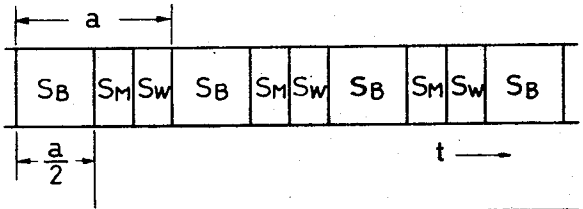
FIGS. 6A and 6B are respectively time charts indicating the sequential relationships with respect to time of the input signals introduced into the adder shown in FIG. 5.
Figure 6B:
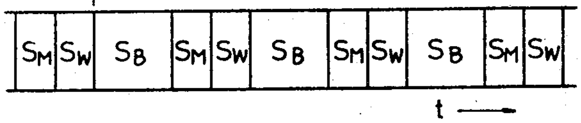

In the case where a signal as indicated in FIG. 6A is supplied directly from the camera tube 14 to one of the input terminals of the adder 25, a signal as indicated in FIG. 6B delayed by a period ($a/2$) which is one half of the period ($a$) of the signal of FIG. 6A by the delay line 24 is supplied to the other input terminal of the adder. Both FIGS. 6A and 6B indicate specific examples of combinations of blue light signals ($SB$), magenta color light signals ($SM$), and white light signals (SW) arranged in a row on a time axis.

Figure 7:
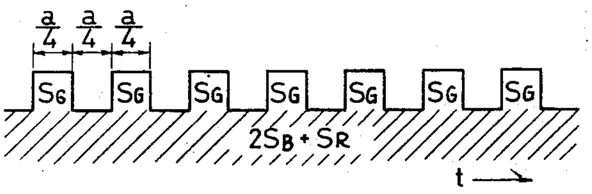
FIG. 7 is a diagram indicating the state of the energy of the output signal of the adder shown in FIG. 5.

The input signals as indicated in FIGS. 6A and 6B which have been applied to the adder 25 are thereby added, and from the output side of this adder 25, a signal as indicated by the example in FIG. 7 is derived and supplied to a succeeding band-pass filter 26. Here, as indicated in FIG. 7, the output signal of the adder 25 is a signal resulting from the superimposition of a green light signal ($SG$) of a period $a/2$ on a signal which is the sum ($2SG+SR$) of a signal $2SB$, which is twice the blue light signal ($SB$) and a red light signal ($SR$).

When the frequency of the carrier wave of a period $a$ is denoted by $f2$, where $f2=2f1$, the green light signal $SG$ shown in FIG. 7 can be represented as a signal occupying the frequency band indicated by curve III shown by two-dot chain line in FIG. 4. In other words, the signal of the frequency band III obtained on the output side of the adder 25 is a second modulated color signal which results from the amplitude modulation of a carrier wave of a frequency $f2$ by the green light signal $SG$.

The output signal of the adder 25 is supplied to the band-pass filter 26, as briefly mentioned above, where the second modulated color signal of the band III is derived and is demodulated by a demodulation circuit 27, whereupon a green light signal $SG$ is obtained. This green light signal $SG$ is applied to the matrix circuit 23 together with the output signal of the aforementioned low-pass filter 20 and the output signal of the demodulation circuit 22.

The matrix signal applied thereto, a green light signal obtained by the demodulation of the first modulated color signal, and a green light signal obtained by the demodulation of the second modulated color signal with mutually suitable polarities and mixture ratios. By this operation, the desired signals, for example, three primary color signals R, G, and B, or three color difference signals are obtained from the matrix circuit 23.

In the case where three primary color signals are to be obtained from the matrix circuit 23, it is so operated that the output signal of the demodulation circuit 22 is subtracted from the output signal of the low-pass filter 20 in the matrix filter 23 thereby to obtain a blue signal; the output signal of the demodulation circuit 27 is subtracted from the output signal of the demodulation circuit 22 (in which case the amplitude ratio of the signals is set at a specific value) thereby to obtain a red signal; and the amplitude of the output signal of the demodulation circuit 27 is adjusted thereby to obtain a green signal.

In the practice of the present invention, the first filter stripe C1 of the color-resolving striped filter 13 may be adapted to transmit the light of any of the three primary colors of the addition mixture colors. However, in the case where it is partucularly adapted to transmit blue light, it is possible to obtain positively a blue light signal whcih is of low energy and, furthermore, to obtain also the signals of the other two primary colors in an amply satisfactory manner, and amply good color signals can be obtained from the output of the matrix circuit 23. Accordingly, a desirable mode of practice of the present invention is one wherein the first filter stripe C1 has the characteristic of transmitting blue light.

Furthermore, by determining by means of the optical system the occupied band of the aforementioned direct signal so as to prevent superimposing of this occupied band of the direct signal and the occupied band of the first modulated color signal, deleterious effects such as occurrence of undesirable crosstalk between the signals of the two bands and beat interference can be prevented.

Another feature of this circuit is that since all of the output signals of the matrix circuit 23 are color signals which have been band limited, the output signals of the matrix circuit 23 can be used directly as they are as encoder input signals. In this case it is not necessary to provide a low-pulse filter in the encoder for band limiting.

Still another advantageous feature of the circuit of this example is that since one of the three filter stripes is adapted to transmit omnichromatic light, or white light, that is, is a transparent stripe, it has an extremely simple organization and can be easily fabricated at low cost. Furthermore, the provision of a device for generating sampling pulses and the like, which were required in conventional color television signal generating apparatuses depending on the phase-separation system, is not necessary, and, moreover, since sampling hold operation is not carried out, it is possible to obtain a color television signal of excellent signal-to-noise ratio. A further advantageous feature of this circuit is that since the filter stripes have positional relationships such that they all exhibit the same space frequency, the color-resolving striped filter can be readily applied in the optical system of the camera tube for generating color signals.

The invention will now be described with respect to a second embodiment of the apparatus according thereto with reference to FIGS. 8 through 14.

Figure 8:
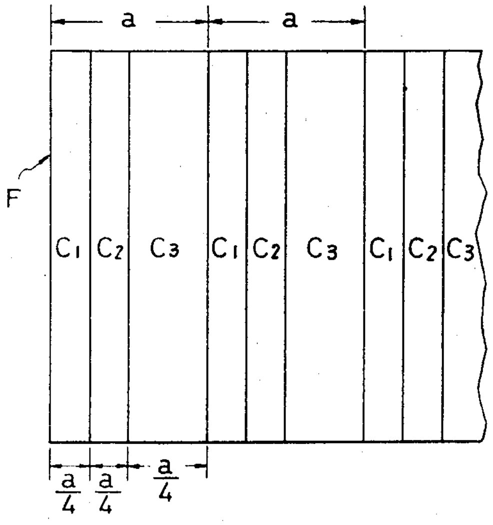
FIG. 8 is an enlarged fragmentary view showing one part of a second embodiment of a color-resolving striped filter.

The color-resolving striped filter in this second embodiment has a pattern as indicated in FIG. 8, wherein a first filter stripe C1 of width $a/4$, a second filter stripe C2 of width $a/4$, and a third filter stripe C3 of width $a/2$ are parallelly and contiguously disposed in the sequence named to form one group of a plurality of identical repeated groups in parallel and contiguous arrangement. The respective light transmission characteristics of the filter stripes C1, C2 and C3 are the same as those of the filter stripes C1, C2, and C3 in the preceding first example described above with reference to FIG. 2.

Figure 9:
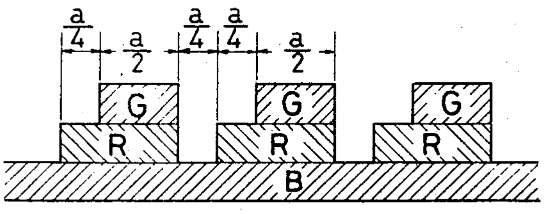
FIG. 9 is a diagram including the state of energy of transmitted light of the color-resolving striped filter shown in FIG. 8.

The state of energy at the time when white light (W) is projected as incident light onto the color-resolving striped filter composed of the filter stripes C1, C2, and C3 of the above described widths is graphically represented in FIG. 9. Blue light (B) is distributed continuously since it is transmitted through all filter stripes C1, C2, and C3. Red light (R) is distributed with a width $3a/4$ and a spacing of $a/4$ since it is transmitted through only filter stripes C2 and C3. Green light (G) is distributed with a width $a/2$ and a spacing of $a/2$ since it is transmitted through only the filter stripe C3.

Accordingly, the output signal S of the camera tube can be represented by the following Fourier series equation.

$$S = (SB + 3SR/4 + SG/2) - (2SG{+}SR/\pi\sin\omega t + SR/\pi\cdot\cos\omega t) - (SR/\pi\ \sin 2\omega t)\ .\ .\ . \qquad (1)$$

In this equation, the space angular frequency $\omega$ is equal to $2\pi f1$, and terms of signal components higher than the third-order high frequency components are omitted.

The first term of the right-hand member of this Eq. (1) represents direct signals due to the primary color signal components *SB*, *Sr*, and *SG* and has a frequency band as indicated by curve IV in FIG. 10. Furthermore, the second term of the right-hand member in this Eq. (1) represents a modulated color signal resulting from the amplitude modulation of a carrier wave of the same frequency value as the aforementioned space frequency $f1$ by a mixture signal of the green signal (*SG*) and the red signal (*SR*) and having a frequency band as indicated by curve V in FIG. 10. The third term of the right-hand member of Eq. (1) represents a modulated primary color signal resulting from the amplitude modulation of a carrier wave of a frequency value $f2$ which is twice the aforementioned space frequency $f1$ by only the red signal (*SR*) and having a frequency band as indicated by curve VI in FIG. 10.

In the case where the respective transmission characteristics of the filter stripes C1, C2, and C3 are made the same as those in the first embodiment, the blue light signal (*SB*) appears in only the direct signal of the curve IV since blue light is transmitted through the entire surface of the color-resolving striped filter. Furthermore, when the green signal (*SG*) which, within one group of the filter stripes, is transmitted therethrough over one half of the lateral width thereof is expressed as a Fourier series, a high-frequency component of an evennumber order does not appear. For this reason, the only high-frequency component of an even-number order of the space frequency of the filter stripes is the signal component due to the red light.

Figure 11:
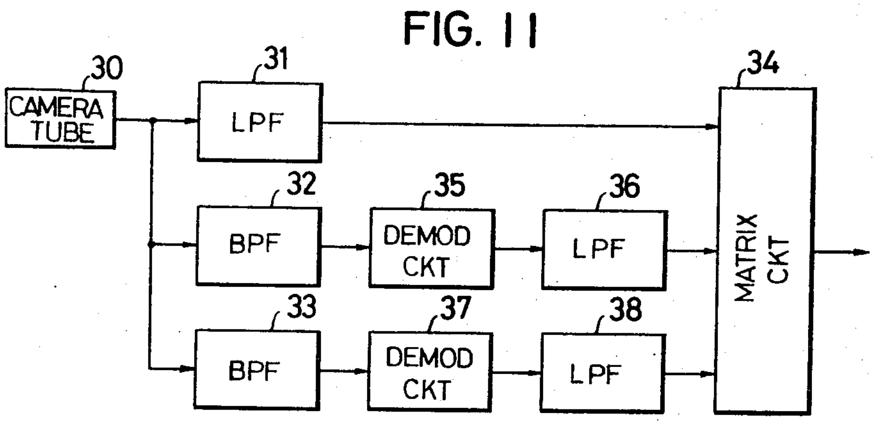
FIG. 11 is a block diagram indicating the essential organization of a second embodiment of a color signal demodulation circuit.
Figure 12:
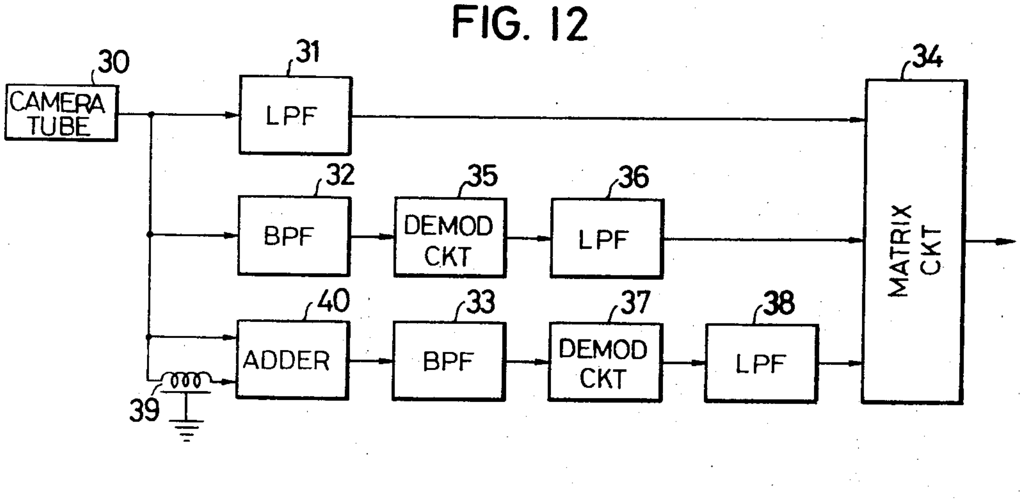
FIG. 12 is a block diagram indicating the essential organization of a third embodiment of a color signal demodulation circuit.

Embodiments of demodulation circuits for the output signal *S* from the above mentioned camera tube are illustrated in FIGS. 11 and 12.

The output signal *S* of the camera tube 30 is supplied respectively to a low-pass filter 31 band-pass filters 32 and 33. From the low-pass filter 31, a direct signal of the above mentioned curve IV is derived. From the band-pass filter 32, a modulated color signal of the curve V is derived. From the band-pass filter 33, a modulated primary color signal of the curve VI is obtained. The direct-wave signal from the low-pass filter 31 is supplied to a matrix circuit 34. The modulated color signal from the band-pass filter 32 is demodulated by a demodulation circuit 35 and, after passing through a low-pass filter 36 and being band limited, is supplied to the above mentioned matrix circuit 34. Furthermore, the modulated primary color signal from the band-pass filter 33 is demodulated by a demodulation circuit 37 and then, after passing through a low-pass filter 38 and being band limited, is supplied to the same matrix circuit 34.

Here, the signal supplied from the low-pass filter 38 to the matrix circuit 34 is a primary color signal due to a certain primary color light obtained by the demodulation of the modulated primary color signal represented by the third term of the right-hand member of Eq. (1). The signal applied to the matrix circuit 34 from the low-pass filter 36 is a mixture signal of two primary colors obtained by the demodulation of the modulated color signal represented by the second term of the right-hand member of Eq. (1), that is, it is a mixture signal of one primary color signal and another primary color signal from the low-pass filter.

Then, in the matrix circuit 34, the signal from the low-pass filter 38 and the signal from the low-pass filter 36 are mixed in appropriate proportions thereby to obtain another one of the primary color signals. Furthermore, by mixing in appropriate proportions in the matrix circuit 34 a direct signal comprising a mixture signal of the three primary color signals represented by the first term of the right-hand member of Eq. (1) from the low-pass filter 31 and the two primary color signals obtained in the above described manner, it is possible to obtain the remaining one primary color signal. Thus, the required three primary color signals are obtained from the matrix circuit 34.

In the demodulation circuit shown in FIG. 11, the signal component in the form resulting from the amplitude demodulation of a carrier wave of a frequency value twice the space frequency $f1$ of the filter stripes is not of a large magnitude, whereby there may occur instances wherein the signal-to-noise ratio becomes a problem.

The problem can be obviated by a circuit as illustrated by one embodiment in FIG. 12, in which those blocks which are the same as those in the embodiment of FIG. 11 are designated by the same reference numerals, and detailed description thereof will not be repeated. The circuit of the instant embodiment differs from that of the preceding embodiment in that it has a delay circuit (delay line) 39 and an adder 40 in the stage in front of the band-pass filter 33.

The delay line 39 possesses a delay characteristic such that it delays input signals by a time period corresponding to one half period ($a/2$) of the space frequency $F1$, that is, a time period corresponding to one period ($a/2$) of a wave of a frequency which is twice the frequency $f1$ of the carrier wave.

Figure 14:
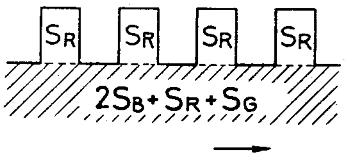
FIG. 14 is a diagram indicating the state of the energy of the output signal of the adder shown in FIG. 12.
Figure 13A:
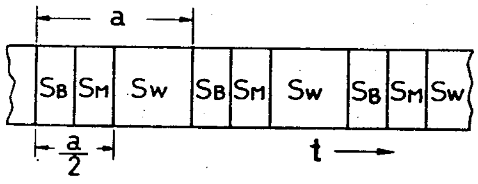
FIGS. 13A and 13B are respectively time charts indicating the sequential relationships with respect to time of the input signals introduced into the adder shown in FIG. 12.
Figure 13B:
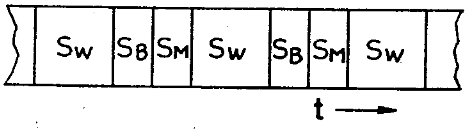

In the case where a signal as indicated in FIG. 13A is supplied directly from a camera tube 30 to one of the input terminals of the adder 40, a signal which has been delayed by a period ($a/2$) equal to one half of the period $a$ of the signal indicated in FIG. 13A from the delay line 39 and is indicated in FIG. 13B is supplied to the other input terminal of the adder 40. As a result of the addition in the adder 40 of the signals indicated in FIGS. 13A and 13B, a signal as illustrated by a representative example in FIG. 14 is obtained from the adder 40 and is supplied to the succedding band-pass filter 33.

Here, the output signal of the adder 40 is a signal resulting from the superimposition of the red signal SR of a period $a/2$ on a definite signal ($2SB + SR + SG$) the sum of a signal $2SB$ which is twice the blue signal ($SB$), the red signal ($SR$), and the green signal ($SG$). When the frequency of the carrier having this period $a/2$ is denoted by $f2$, where $f2 = 2f1$, the red signal $SR$ indicated in FIG. 14 occupies the frequency band indicated by curve VI in FIG. 10. In other words, the signal of the frequency band VI obtained in the output of the adder 40 is a modulated primary color signal resulting from the amplitude modulation of the carrier wave of frequency $f2$ by the red signal $SR$.

Figure 10:
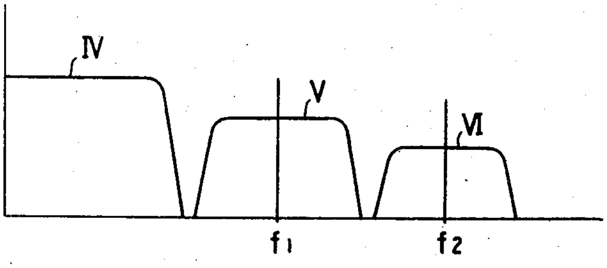
FIG. 10 is a graphical representation indicating the frequency band of the output signal of a camera tube.

Accordingly, as a result of the supply of the output signal of the adder 40 to the band-pass filter 33, a modulated primary color signal of the frequency band indicated by curve VI in FIG. 10 is obtained. This signal is demodulated by the demodulator 37, whereupon a red signal $SR$ is obtained. This red signal $SR$ has an amplitude which is twice that of the red signal $SR$ obtained from the demodulator 37 in the demodulation circuit illustrated in FIG. 11. Therefore, the problem of the $S/N$ ratio in the circuit of FIG. 11 is solved.

The matrix circuit 34 carries out appropriate matrixing of the direct signal from the low-pass filter 31, the mixture signal obtained by the demodulation of the modulated color signal from the low-pass filter 36, and the above mentioned red signal from the low-pass filter 38 and produces as output the required signal such as three primary color signals or three color difference signals.

By the use of the color-resolving striped filter in the instant embodiment illustrated in FIG. 8, a high level of the direct-wave signal component can be attained, whereby the instant device can be applied effectively also to color television cameras of the single-tube type.

Next, a specific embodiment of the matrix circuits 23 and 34 will be described.

When the output signal $S$ in the first embodiment described with reference to FIG. 5 is expressed by a Fourier series similar to that of Eq. (1), the following expression is obtained.

$$S = (SB + SR/2 + SG/4) - (2SR + SG/\pi \sin\omega t - SG/\pi \cos\omega t) - (SG/\pi \sin 2\omega t) \ldots \quad (2)$$

When, in the right-hand member of each of Eqs. (1) and (2), the first, second, and third terms are collectively denoted by $S0$, $S1$, and $S2$, respectively, the direct signal $S1$ is a mixture signal of three primary color signals, while the modulated color signal $S1$ is a signal of a form resulting from the amplitude modulation of a carrier wave of the space frequency $f1$ by signals of the two primary colors other than the primary color of the primary color light capable of being transmitted through the first filter stripe C1. Furthermore, the modulated primary color signal $S2$ is a signal of a form resulting from the amplitude modulation of a carrier wave of a frequency value $f2$ which is twice the space frequency $f1$ by only the signal of a single primary color remaining after elimination of two other primary colors, one of which is the primary color of the primary color light capable of being transmitted through the entire surface of the color-resolving striped filter, and the other of which is the primary color of the primary color light capable of being transmitted through exactly one half of the lateral width of each filter stripe group.

Figure 15:
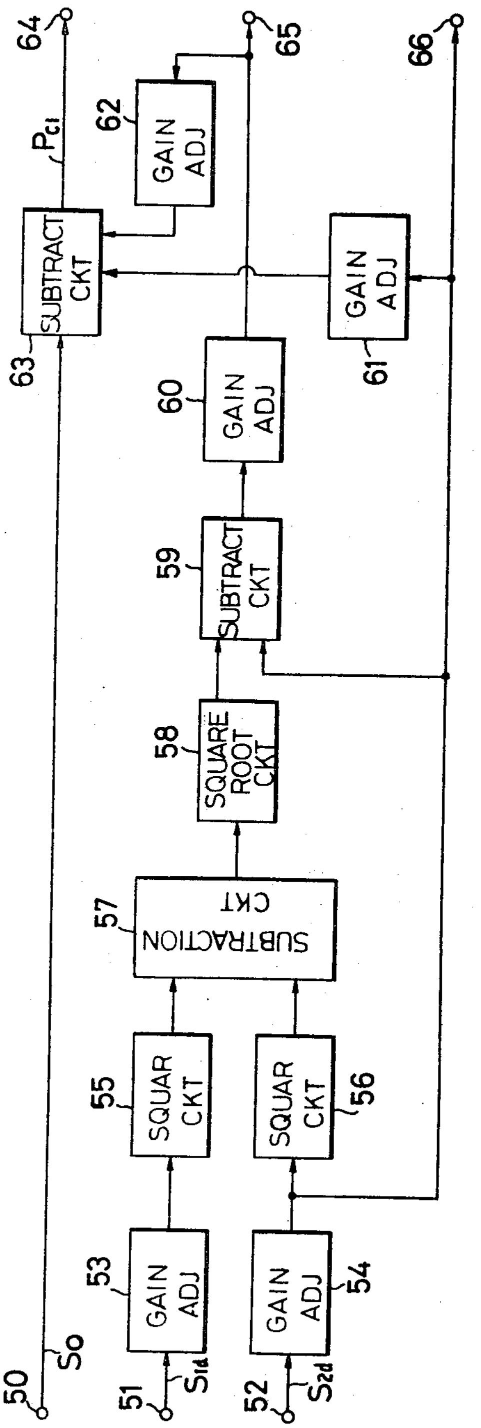
FIG. 15 is a block diagram illustrating one embodiment of a matrix circuit.

One embodiment of the matrix (operation) circuits 23 and 34 is illustrated by the block diagram in FIG. 15. This circuit is provided with three input terminals 50, 51, and 52 to which are supplied, respectively, the above mentioned direct signal $S0$, a demodulation signal $S1d$ of the demodulated color signal $S1$, and the demodulation signal $S2d$ of the demodulated color signal $S2$.

In the case where the color-resolving striped filter is of the organization indicated in FIG. 2, the signals $S0$, $S1d$, and $S2d$ supplied to these input terminals 50, 51 and 52 are as follows.

$$S0 = SB + SR/2 + SG/4 \ldots \quad (3)$$

$$S1d = \sqrt{(2SR + SG)^2 + SG^2}/\pi \ldots \quad (4)$$

$$S2d = SG/\pi \ldots \quad (5)$$

Furthermore, in the case where the color-resolving striped filter is of the organization indicated in FIG. 8, the signals $S0$, $S1d$, and $S2d$ supplied to the input terminals 50, 51, and 52 are as follows.

$$S0 = SB + 3SG/4 + SG/2 \ldots \quad (6)$$

$$S1d = \sqrt{(2SG+SR)^2 + SR^2}/\pi \ldots \quad (7)$$

$$S2d = SR/\pi \ldots \quad (8)$$

The signal $S2d$ supplied to the input terminal 52 is multiplied by $\pi$ times by a gain adjustment circuit 54 and thereby rendered into a primary color signal, which, on one hand, is sent to an output terminal 66 and, on the other, is supplied as a subtrahend to a first subtraction circuit 57 by way of a squaring circuit 56. The signal $S1d$ impressed on the input terminal 51 is multiplied by $\pi$ times by a gain adjustment circuit 53 and, passing through a squaring circuit 55, is supplied as a minuend to the above mentioned subtraction circuit 57.

The output signal of the subtraction circuit 57 is supplied as a minuend to a second subtraction circuit 59 by way of square-root circuit 58. On one hand the output of the above mentioned gain adjustment circuit 54 is being supplied as a subtrahend to the second subtraction circuit 59. Consequently, the other one primary signal constituting the mixture signal of two primary color signals is obtained from this subtraction circuit 59. The output signal of this subtraction circuit 59 is halved by a gain adjustment circuit 60 and is led out through an output terminal 65.

The mixture signal of three primary color signals supplied to the input terminal 50 is supplied as a minuend to a third subtraction circuit 63. The primary color signals sent respectively to the output terminals 66 and 65, after being adjusted to the required amplitude by the gain adjusting circuits 61 and 62, are applied as subtrahends to this subtraction circuit 63. Consequently, the output of this third subtraction circuit 63 is the remaining one primary color signal, which is led out through an output terminal 64. Thus, accurate signals of the three primary colors are led out from the output terminals 64, 65, and 66.

In the reproduction of the signals in the above described embodiment, a squaring circuit, subtraction circuits, a square-root circuit, and the like are used to process the mixture signal $S1d$ of the two primary color signals representable by Eqs. (4) and (7), which has been supplied to the input terminal 51. However, the required signals may also be obtained by approximating with a first-order equation the mixture $S1d$ of the two primary color signals representable by the above mentioned two equations and applying this together with the other two kinds of signals to an addition-subtraction matrix circuit.

Here, when the three primary color signals are denoted by $PC1$, $PC2$, and $PC3$, and substituted in the expressions for the aforementioned three signals $S0$, $S1d$, $S2d$, the above Eqs. (3), (4), and (5) can be rewritten as in the following Eqs. (3*a*), (4*a*), and (5*a*).

$$S0 = PC1 + PC2/2 + PC3/4 \ldots \quad (3a)$$

$$S1d = \sqrt{(2PC2+PC3)^2 + PC3^2}/\pi \ldots \quad (4a)$$

$$S3d = PC3 \ldots \quad (5a)$$

Eqs. (6), (7), and (8) can be similarly rewritten. By selecting coefficients $\alpha$ and $\beta$ such that the above Eq. (4*a*) can be approximated by a first-order equation related to the two primary color signals $PC2$ and $PC3$, the signal $S1d$ can be expressed as follows.

$$S1d \approx \alpha \cdot PC2 + \beta \cdot PC3 \ldots \quad (4a1)$$

The signal of this Eq. (4*a*1) and the signals of the above Eqs. (3*a*) and (5*a*) are applied to an addition-subtraction matrix circuit thereby to obtain the required signals from the output of this matrix circuit. Then, by applying the three signals $S0$, $S1d$, and $S2d$ to the addition – subtraction matrix circuit, the required signals can be obtained in a simple manner.

Figure 16:
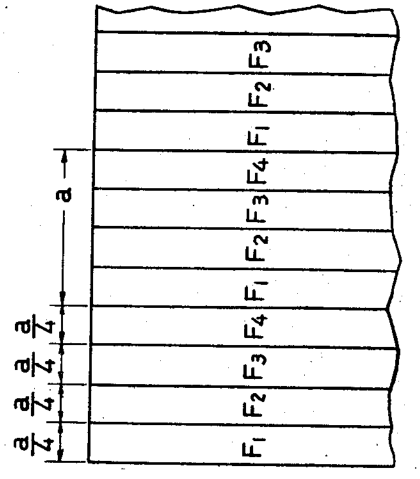
FIG. 16 is an enlarged fragmentary view showing one part of a third embodiment of a color-resolving striped filter.

A third embodiment of the apparatus according to the invention will next be described with reference to FIGS. 16 and 17. As shown in FIG. 16, the color-resolving striped filter of this apparatus comprises a plurality of groups of filter stripes in parallel and contiguous arrangement, each group being composed of first, second, third, and fourth stripes, $F1$ through $F4$, disposed parallely and contiguously and all being of the same width $a/4$.

The light transmitting characteristics of the filter stripes are as follows. The first filter stripe $F1$ transmits the light of one primary color from among the three primary colors of the addition mixture color. The second filter stripe $F2$ transmits the light of a mixture color of the primary color light transmitted by the first filter stripe $F1$ and one of the other two primary colors. The third filter stripe $F3$ transmits the light of a mixture color of the primary color light transmitted through the first filter stripe $F1$ and the primary color light which cannot pass through the second filter stripe $F2$. The fourth filter stripe $F4$ transmits the light of all colors.

More specifically, the second and third filter stripes $F2$ and $F3$ are so formed that, depending on the primary color light, i.e., blue light (B), green light (G), or red light (R), transmitted through the first filter stripe $F1$, they respectively transmit light of colors of the following relationships.

| Color of light transmitted by F1 | Color of light transmitted by F2 | Color of light transmitted by F3 |
|---|---|---|
| B | C | M |
| B | M | C |
| G | C | Y |
| G | Y | C |
| R | Y | M |
| R | M | Y |

The above color symbols are as follows: B, blue; G, green; R, red; C, cyan (mixture color of glue and green); M, magenta; and Y, yellow (mixture color of green and red).

One example of a color-resolving striped filter having filter stripes of the above described combinations is the combination indicated in the first line, that is, the combination wherein: the first filter stripe $F1$ transmits blue light (B); the second filter stripe $F2$ transmits the light of a mixture color (cyan) of blue and green; the third filter stripe $F3$ transmits the light of a mixture color (magenta) of blue and red; and the fourth filter stripe $F4$ transmits the light of a mixture color of blue, red, and green, i.e., the light of all colors, or white light. This filter will not be considered more fully.

Figure 17:
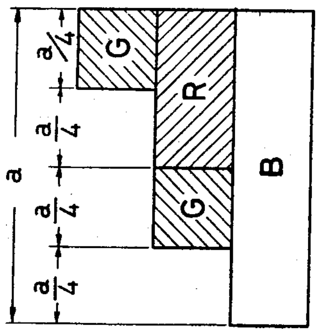
FIG. 17 is a diagram indicating the state of energy of transmitted light of the color-resolving striped filter shown in FIG. 16.

In the case where white light is projected as incident light onto a color-resolving striped filter comprising filter stripes of this combination, the state of energy of the light transmitted thereby is indicated in FIG. 17, wherein: blue light (B) exists over the entire structure; green light (G) exists with a width $a/4$; red light (R) exists with a width $a/2$; and green light (G) exists with a width $a/4$.

The output signal obtained from a camera tube 70 provided with a color-resolving striped filter of the above described organization can be represented by the following Fourier series.

$$S = (SB + SR/2 + SG/2) - 2SR/\pi \cdot \sin \omega t - SG/\pi \cdot \sin 2\omega t \quad \ldots \qquad (9)$$

The first term of the right-hand member of this Eq. (9) represents a direct signal due to the primary colors $SB$, $SR$, and $SG$. The second term represents a first modulated color signal resulting from the amplitude modulation of a carrier wave of the same frequency as the space frequency $f1a$ determined by the number of groups of the filter stripes $F1$ through $F4$ by the red signal. The third term represents a second modulated color signal resulting from the amplitude modulation of a carrier wave of a frequency $f2a$ equal to twice the above mentioned space frequency $f1a$ by only the green signal.

For the demodulation circuit for the above mentioned output signal $S$, a demodulation circuit of an organization, for example, as shown in FIG. 11 can be used. The color-resolving striped filter shown in FIG. 16 can be readily fabricated since all filter stripes thereof are of equal pitch ($a/4$).

Further, this invention is not limited to these embodiments but various variations and modifications may be made without departing from the scope and sprit of the invention.

What we claim is:

1. A color television signal generating apparatus comprising: a color-resolving striped filter comprising a plurality of groups of filter stripes in sequentially repeated arrangement, each of said groups comprising a first filter stripe having a light transmission characteristic such as to transmit the light of one of the three primary colors of an addition mixture color, a second filter stripe having a light transmission characteristic such as to trasmit the light of a mixed color of the primary color transmitted through said first filter stripe and one of the other two primary colors, and a transparent third filter stripe transmitting white light, said first, second, and third filter stripes being arranged parallelly and contiguously in a specific sequence such that all stripes have the same space frequency; a camera tube provided on the front surface thereof with said color-resolving striped filter and operating to send out as an output signal a superimposed signal comprising, in superimposition, a direct wave signal of a signal of the primary color of the primary color light transmitted through the first filter stripe, a first modulated color signal representable as a signal resulting from the amplitude modulation of a carrier wave of a frequency equal to said space frequency by the signals of the two primary colors other than the primary color thus transmitted, and a second modulated color signal representable as a signal resulting from the amplitude modulation of a carrier wave of a frequency equal to twice said space frequency by the signal of the primary color which has a complementary color relationship with respect to the light of the mixed color transmitted through the second filter stripe; first separation means for separating said direct wave signal from the output signal of said camera tube; second separation means for separating said first modulated color signal from the output signal of the camera tube; third separation means for separating said second modulated color signal from the output signal of the camera tube;

first demodulation means for demodulating said first modulated color signal thus separated;

second demodulation means for demodulating said second modulated color signal thus separated; and matrix means supplied with the outputs of said first separation means and said first and second demodulation means to carry out matrixing and thereby to generate required output signals of three primary color signals or of three color difference signals.

2. A color television signal generating apparatus as claimed in claim 1, in which the three filter stripes are so organized that one of the two primary color lights other than the primary color light transmissible through the first filter stripe is transmitted through one half of the transverse width of one of said groups of filter stripes, and, moreover, the other of said two primary color lights is transmitted with a transmission width differing from each of the transmission widths of the primary color light transmissible through the first filter stripe and the primary color light transmitted through one half of said transverse width.

3. A color television signal generating apparatus as claimed in claim 1, in which the second and third filter stripes in each group of filter stripes have the same width, and the first filter stripe has a width which is twice that of the second and third filter stripes.

4. A color television signal generating apparatus as claimed in claim 1, in which the first and second filter stripes in each group of filter stripes have the same width, and the third filter stripe has a width which is twice that of the first and second filter stripes.

5. A color television signal generating apparatus as claimed in claim 1, in which each group of filter stripes has further a fourth filter stripe having a light transmission characteristic such as to transmit the light of a mixed color of the primary color light transmitted through the first filter stripe and the primary color light which cannot be transmitted through the second filter stripe, and the first through fourth filter stripes all have the same width.

6. A color television signal generating apparatus as claimed in claim 1, in which there are further provided delay means for delaying the output signal of the camera tube by one half of the period of the space frequency and adding means for adding the output signal of the camera tube and the delayed signal from said delay means, said delay means and said adding means being disposed in an operational position in front of said third separation means.

7. A color television signal generating apparatus as claimed in claim 1, in which there are further provided first low-pass filtering means for deriving only a demodulation signal of said first modulated color signal from said first demodulation means and second low-pass filtering means for deriving only a demodulation signal of said second modulated color signal from said second demodulation means.

8. A color television signal generating apparatus as claimed in claim 1, in which said matrix means comprises:

a first squaring circuit for squaring the output of said first demodulation means;

a second squaring circuit for squaring the output of said second demodulation means;

a first subtraction circuit supplied with the output of said first squaring circuit as a minuend and with the output of said second squaring circuit as a subtrahend;

a square-root circuit for deriving the square-root of the output of said first subtraction circuit;

a second subtraction circuit supplied with the output of said square-root circuit as a minuend and with the output of said second demodulation means as a subtrahend;

a third subtraction circuit supplied with the output of said first separation means as a minuend and with the output of said second subtraction circuit and the output of said second demodulation means respectively as subtrahends; and means for deriving as a required output signal of said matrix means the respective outputs of said second demodulation means, said second subtraction circuit, and said third subtraction circuit.

* * * * *